(12) United States Patent
Del Gaudio et al.

(10) Patent No.: US 8,691,732 B2
(45) Date of Patent: Apr. 8, 2014

(54) WATER-BASED FLUID FOR PREVENTING THE FORMATION OF W/O EMULSIONS OR FOR RESOLVING W/O EMULSIONS ALREADY FORMED IN POROUS MATRICES

(75) Inventors: Lucilla Del Gaudio, San Donato Milanese (IT); Paola Albonico, Milan (IT); Sandra Cobianco, San Donato Milanese (IT); Chiara Neva Emiliani, Milan (IT); Giuseppe Ripa, Belgioioso (IT)

(73) Assignee: ENI S.p.A., Rome (IT)

( * ) Notice: Subject to any disclaimer, the term of this patent is extended or adjusted under 35 U.S.C. 154(b) by 388 days.

(21) Appl. No.: 12/664,483

(22) PCT Filed: Jun. 9, 2008

(86) PCT No.: PCT/EP2008/004678
§ 371 (c)(1),
(2), (4) Date: May 4, 2010

(87) PCT Pub. No.: WO2008/151791
PCT Pub. Date: Dec. 18, 2008

(65) Prior Publication Data
US 2010/0216670 A1    Aug. 26, 2010

(30) Foreign Application Priority Data
Jun. 14, 2007  (IT) .................... MI2007A001196

(51) Int. Cl.
*C09K 8/08*     (2006.01)
*C09K 8/52*     (2006.01)
*C09K 8/68*     (2006.01)
*E21B 37/06*    (2006.01)
*E21B 43/16*    (2006.01)
*E21B 37/00*    (2006.01)

(52) U.S. Cl.
USPC ............ 507/110; 507/90; 507/203; 507/927; 507/929; 507/936; 507/935; 166/304; 166/305.1; 166/311

(58) Field of Classification Search
USPC ........... 507/90, 203, 927, 929, 931, 935, 936; 166/304, 305.1, 311
See application file for complete search history.

(56) References Cited

U.S. PATENT DOCUMENTS 4,787,990 A * 11/1988 Boyd .............................. 175/42
5,164,116 A * 11/1992 Berkhof et al. ............... 516/179

(Continued)

FOREIGN PATENT DOCUMENTS

WO    99 25803       5/1999
WO    2007 085423    8/2007

OTHER PUBLICATIONS

SPE 61217, "Technological Development as a way for Operational cost and HSE Optimisation", Ferrari., et.al, Jun. 2000.*

(Continued)

*Primary Examiner* — Aiqun Li
(74) *Attorney, Agent, or Firm* — Oblon, Spivak, McClelland, Maier & Neustadt, L.L.P.

(57) ABSTRACT

A water-based fluid, containing: a non-ionic surfactant, which is stable in a temperature range from 10 to 90° C. and soluble in water; and a salt, wherein the non-ionic surfactant contains an alkyl polyglucoside selected from the group consisting of a $C_8$ alkyl polyglucoside, a $C_{10}$ alkyl polyglucoside, and mixtures thereof, and the salt is present, and is present in an amount up to 60%. In addition, a process for preventing the formation of a W/O inverse emulsion or resolving a W/O inverse emulsion that has already formed in an oil well in which an oil-based mud has been employed by injecting the water-based fluid into the oil well.

20 Claims, 2 Drawing Sheets

Comparison of flow curves of two emulsions formulated with KCl 3% and CaCl$_2$ 34%, respectively.

(56) References Cited

U.S. PATENT DOCUMENTS

| | | | |
|---|---|---|---|
| 5,830,831 A | 11/1998 | Chan et al. | |
| 6,063,737 A * | 5/2000 | Haberman et al. | 507/261 |
| 6,090,754 A | 7/2000 | Chan et al. | |
| 6,090,762 A * | 7/2000 | Clapperton et al. | 510/108 |
| 6,358,905 B1 | 3/2002 | Render et al. | |
| 6,972,274 B1 * | 12/2005 | Slikta et al. | 507/240 |
| 2002/0032243 A1 * | 3/2002 | Tabacchi et al. | 516/98 |
| 2002/0155954 A1 * | 10/2002 | Aven | 504/348 |
| 2006/0105919 A1 * | 5/2006 | Colaco et al. | 507/209 |

OTHER PUBLICATIONS

MSDS datasheet of Triton BG 10 of Dow Chemical, Mar. 1, 2006.*

* cited by examiner

Comparison of flow curves of two emulsions formulated with KCl 3% and CaCl$_2$ 34%, respectively.

Samples 4 hours after the starting of the test. From left to right: blank, DFE 5%, Glucopon 5%.

WATER-BASED FLUID FOR PREVENTING THE FORMATION OF W/O EMULSIONS OR FOR RESOLVING W/O EMULSIONS ALREADY FORMED IN POROUS MATRICES

The present invention relates to a water-based fluid which can be used as completion fluid for preventing the formation of inverse W/O emulsions in oil wells or as a remedial fluid for resolving W/O emulsions already formed.

More specifically, the invention relates to a fluid comprising non-ionic surfactants characterized by a suitable HLB and possible salts, which can be used for preventing the formation of inverse W/O emulsions or for resolving them when they have already been formed, in oil wells in which oil-based drilling fluids have been used.

The productivity of an oil well is strongly influenced by all the operations which are carried out in the well from the first drilling phases until completion.

The drilling of gas mineralized wells, characterized by productive formations with a high clay content, mainly reactive, generally requires the use of drilling fluids capable of stabilizing the walls of the hole to prevent the well from collapsing due to the swelling action of the reactive clays. Oil-based fluids can be used for this purpose, generally inverse W/O emulsions, or fluids based on water containing specific additives capable of interacting with clays and limiting swelling problems.

In some cases, however, especially in multilayer formations, the water fluids do not guarantee satisfactory results and consequently the only alternative is the use of an oil-based fluid.

The interaction however of the oil drilling fluid present as residue or filtered from the porous matrix, with that used in the subsequent completion phase, normally a saline water solution (brine), can cause a temporary or permanent reduction in the well productivity.

It has in fact been observed that when the filtrate of the oil-based mud which penetrates the porous matrix during perforation, comes into contact with the completion brine, it can form emulsions of the W/O type, very viscous and stable even at a high temperature.

The filtrate of the oil-based mud, as the term itself indicates, consists of oil (lamium, gas oil) and surfactants present in the mud formulation, characterized by a low HLB. Polyamides of modified fatty acids, amines of alkoxylated fatty acids are those which are most frequently found in commercial formulations of oil-based mud. These surfactants are used for formulating oil-based mud as they allow extremely stable inverse W/O emulsions to be obtained.

Once the completion phase has been completed, the well is opened and the production is started. In some cases, however, mainly in gas wells, the delivery is slow, or there is not even any production of hydrocarbons.

Among the possible damage mechanisms which can cause the lack of delivery, the most probable is the formation of emulsions. If a W/O emulsion is formed, it can have a high viscosity and cannot be removed by subsequent flushings with brine as the continuous phase consists of oil: this type of emulsions acts as a real plug which obstructs the delivery.

The damage induced by emulsions is a problem which can occur in producer wells where a lack of hydrocarbon delivery can be observed and in water-injector wells, when the water injected for sustaining the field pressure, is injected into an oil level.

There are currently no effective technologies for resolving/preventing this problem. The only alternative option is to use water-based mud for drilling, compatible with the completion fluid (brine).

This option however is not always possible in wells with a high reactive clay content, where the use of water-based mud could cause serious problems of instability of the hole.

It has now been found that when oil-based drilling fluids are used, which have been formulated with a particular type of surfactants, the use of a water-based fluid to which surfactants characterized by a suitable HLB and solubility in aqueous solutions with a high saline content have been added, both prevents the formation of a W/O inverse emulsion and resolves the above emulsion if this has already been formed. In the first case, we speak of using completion fluids, in the second, of using remedial fluids.

An objective of the present invention relates to a water-based fluid, for use in the oil field, comprising non-ionic surfactants, stable at temperatures ranging from 10 to 90° C., having an HLB ranging from 8 to 20 and soluble in water, with a saline content ranging from 0 to 60% by weight and possibly salts.

Figure 1:
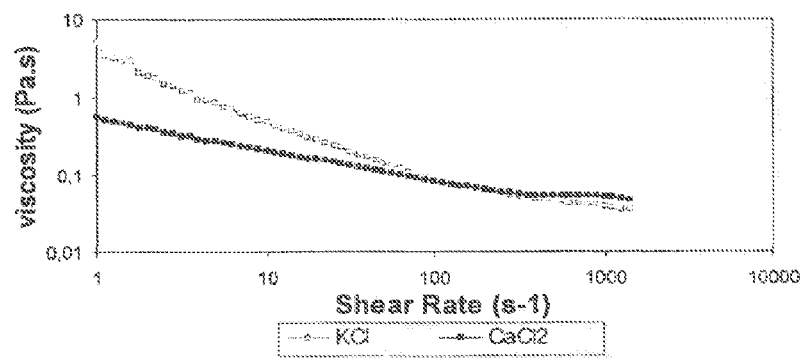
FIG. 1: A comparison of flow curves of two emulsions formulated with 3% of KCl and 34% of $CaCl_2$.

The use of said fluid for preventing the formation of W/O inverse emulsions or for resolving emulsions already formed in oil wells in which oil-based mud is used, represents a further objective of the present invention.

The salts present in the fluid of the present invention, are generally selected from $CaCl_2$ at a concentration ranging from 1-35% by weight, KCl at a concentration ranging from 1-10% by weight, $CaBr_2$ at a concentration ranging from 40-60% by weight.

The non-ionic surfactants added to the fluid of the invention preferably have an HLB ranging from 10 to 15.

When the fluid is used for preventing the formation of W/O emulsions, it is called completion fluid or brine, and, in this case, the surfactants are present at a concentration ranging from 0.1 to 1% by weight, whereas when it is used for resolving emulsions already formed, it is called remedial fluid or brine, and the surfactants are present at a concentration ranging from 0.2 to 5% by weight.

The fluids of the invention can be suitably used for preventing or breaking W/O inverse emulsions in hydrocarbon production wells and in water-injector wells, which are the reason for the lack of hydrocarbon delivery.

The group of alkyl polyglucoside surfactants has proved to be particularly suitable for the purposes of the present invention, as it is stable within the temperature range of 10-90° C. and is soluble in water, with a salt content ranging from 0 to 60% by weight.

Completion or remedial fluids can be prepared, for example, including commercial alkyl polyglucoside surfactants, with no toxicity, which are already used in various fields (detergence, cosmetic, food industry), such as Seppic products marked SIMULSOL SL 8 APG (a C8-C10 alkyl polyglucoside), SIMULSOL SL 10 APG (a C10 alkyl polyglucoside), and Cognis product called GLUCOPON® 215 CSUP (a C8-10 alkyl polyglucoside).

The use of some of these is already known in the oil field, for cleaning applications of the casing.

Particularly satisfactory results have been obtained with GLUCOPON® 215 CSUP, an alkyl polyglucoside of Cognis, having a structure as shown in formula (1), wherein R represents an alkyl chain with a C8-C10 length and n has the value of 1.5 and represents the oligomerization degree

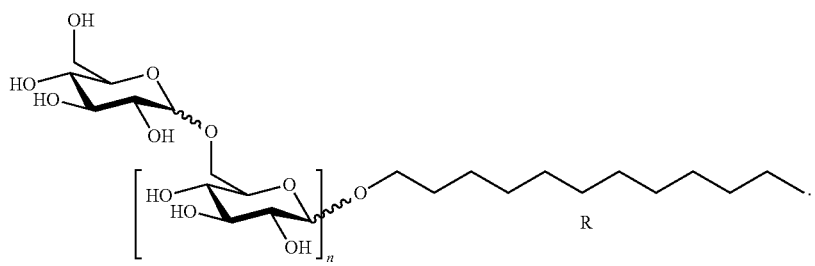

(1)

The completion fluid of the invention is particularly effective when it interacts with oil-based drilling fluids which are present in the formation as residue or filtrate from the porous matrix.

The remedial fluid of the invention, on the contrary, is particularly effective when it interacts directly with an already formed W/O emulsion, present in the formation as interaction product between fluids used in previous treatment (for example between a residue or filtrate of an oil-based drilling mud and a traditional completion brine).

The oil-based drilling fluids mainly consist of an oil, generally a low toxicity paraffin oil, used as dispersing phase, such as lamium, for example, and a surfactant or a pair of surfactants, one of which acts as primary emulsifier (present in the mud at a concentration of 3-5% v/v) and the other one as secondary emulsifier (1-3% v/v in the mud).

| Mud Nr. | Primary emulsifier 0.33% v/v | Secondary emulsifier 0.13% v/v |
|---|---|---|
| 1 | Polyamine fatty acids | |
| 2 | Alkoxylated amines of fatty acids | Sulphonic acid |
| 3 | Polyamine fatty acids | |
| 4 | Non-ionic surfactant | |
| 5 | Alkoxylated amines of fatty acids | Ester phosphate |

The following are examples of surfactants or pairs of surfactants which are present in the main commercial types of oil-based mud:

These surfactants are available on the market under the following trade-names:

| Mud Nr. | Primary emulsifier 0.33% v/v | Secondary emulsifier 0.13% v/v |
|---|---|---|
| 1 | NOVATEC P | NOVATEC S |
| 2 | INVERMUL NT | EZ MUL NT |
| 3 | AVOIL PE LT | AVOIL SE LT |
| 4 | CARBOTEC | CARBOMUL |
| 5 | FAZE MUL | FAZE WET |

The filtrate generally consists of all the components present in the oil-based mud which are able to filter through the porous matrix.

The model filtrates used in the present invention were prepared by dissolving in lamium, a pair of surfactants selected from those present in the six types of oil-based muds previously considered.

The concentration of the surfactants in lamium however is an order of magnitude lower than the minimum value used in the original mud formulation (0.33% v/v primary emulsifier, 0.13% v/v secondary emulsifier). In this way, a low residue of the two surfactants was simulated on site, assuming a comparable filtration in the matrix.

The examples provided below are for illustrative and non-limiting purposes of the present invention.

FORMATION OF EMULSIONS

Example 1

In this example, the formation of emulsions with variations in the W(brine)/O(synthetic filtrate) ratio, was verified.

A synthetic oil filtrate (FS) was used, comprising lamium, a low toxicity paraffin oil used for the formulation of the oil-based drilling fluids (OBM) and two polyamine fatty acid surfactants NOVATEC P (primary) and NOVATEC S (secondary), in which the primary emulsifier is present at a concentration of 0.33% v/v and the secondary emulsifier at a concentration of 0.13% v/v.

A given volume of FS is mixed—in a 500 ml beaker, at a temperature of 25° C., under stirring (500 rpm) by means of a Silverson stirrer, for ten minutes—with an aqueous solution of $CaCl_2$ (salt concentration of 380 g/l) at three different mixing ratios: 75/25, 50/50 and 25/75, for a total volume of 200 ml. The formation of a W/O emulsion stable for months was observed for the three mixing ratios. The emulsions were characterized by means of rheological and electric conductivity measurements. Table 1 shows the results obtained.

Example 2

In this example, the formation of emulsions also with other completion brines, was evaluated.

The formation of emulsions was verified using the same procedure described in example 1, but considering the W/O mixing ratio equal to 75/25 only, as it is considered the most representative of real well conditions, the formation of emulsions with other completion brines was also verified: $CaCl_2$ 3%, $CaCl_2$ 10%, KCl 3% and $CaBr_2$ 54%. The formation of stable and viscous W/O emulsions were observed with all the brines used, as confirmed by the electric conductivity data of the various emulsions, compared with the electric conductivity value measured for the same brine, reported in Table 2.

From the rheological characterization it can also be seen that the viscosity at low shear rates of the emulsions formulated with KCl 3% is higher by about an order of magnitude with respect to those containing CaCl$_2$ at 34%, as illustrated by comparison of the flow curves of FIG. 1.

Example 3

In this example, the formation of emulsions with representative synthetic filtrates of different commercial oil-based muds and KCl 3% as completion brine, was evaluated.

Synthetic filtrates of all the five commercial oil-based muds shown in the table below reported, were prepared and emulsified in a ratio of 25/75 with KCl at 3%.

| Mud Nr. | Primary emulsifier 0.33% v/v | Secondary emulsifier 0.13% v/v |
|---|---|---|
| 1 | NOVATEC P | NOVATEC S |
| 2 | INVERMUL NT | EZ MUL NT |
| 3 | AVOIL PE LT | AVOIL SE LT |
| 4 | CARBOTEC | CARBOMUL |
| 5 | FAZE MUL | FAZE WET |

In all cases, an emulsion was prepared which was stable over time, for months, and viscous.

Example 4

In this example, the formation of emulsions with synthetic filtrates representative of different commercial oil-based muds and CaCl$_2$ as completion brines, is evaluated.

Synthetic filtrates of all the five commercial oil-based muds reported in the previous example, were prepared and emulsified in a ratio of 25/75 with CaCl$_2$ d=1.25 s.g. In all cases, a stable and viscous emulsion was produced.

Prevention of the Formation of Emulsions:
Evaluation of the Effictiveness of the Completion Fluid Example 5

In this example, the effectiveness of the prevention treatment object of this patent, is evaluated.

Using the same procedure described in example 1, the possibility of preventing the formation of emulsions by adding a surfactant to the brine, was verified. The surfactants used belong to the class of the non-ionic, alkyl polyglucosides, soluble in the brines used for the test. The concentrations adopted range from 0.2 to 1% as reported in Table 3. As can be observed from the electric conductivity values, all the surfactants tested allow to prevent a W/O emulsion as they are characterized by a conductivity comparable with that of the brine used, with the exception of the SIMULSOL SL 4 APG (a C4 alkyl polyglucoside) system which did not give positive results at the concentration used.

Example 6

In this example, the prevention of emulsion formation with synthetic filtrates representative of different commercial oil-based muds and CaCl$_2$ d=1.25 added with 0.5% of GLUCOPON® 215 CSUP, is evaluated.

50 ml of synthetic filtrate (25% by volume) representative of the selected 5 commercial oil-based muds, are emulsified with 150 ml of CaCl$_2$ d=1.25 (75% by volume) added with 0.5% of GLUCOPON® 215 CSUP, for 10 minutes at 5,000 revs with a Silverson equipped with a grid with rectangular holes, in a 250 ml high-shaped beaker. The ratio between water phase and oil phase was maintained constant to evaluate all the synthetic filtrates, assuming the excess of brine as being representative of a field situation.

With this procedure, the possibility of preventing the formation of viscous and stable emulsion through the addition of a surfactant to the brine (GLUCOPON® 215 CSUP at 0.5%), was verified.

At the end of the emulsifying procedure, all the five systems evaluated, for periods of time less than 30 minutes, showed a perfect separation of the oil phase from the water phase. The two separated phases were limpid.

Example 7

Verification of the prevention of the formation of stable emulsion with synthetic filtrates representative of different commercial oil-based muds and KCl 3% added with 0.5% of GLUCOPON® 215 CSUP.

The same experimentation reported in example 6 was carried out, but changing the brine.

In this case, at the end of the emulsifying procedure, almost all the five systems evaluated reached, over a period of less than 30 minutes, a perfect separation of the oil phase from the water phase. The two separate phases were limpid. For the emulsions coming from the synthetic filtrate with CARBOTEC (non-ionic surfactant)+CARBOMUL (non-ionic surfactant) and FAZE MUL (alkoxylated amines of fatty acids)+FAZE WET (ester phosphate) as surfactants in the starting filtrate, the formation of always unstable emulsions but which require much longer resolution times, was observed.

Resolution of Already Formed Emulsions:
Evaluation of the Effectiveness of the Remedial Fluid Example 8

In this example, the resolution of emulsions (made with synthetic filtrate and CaCl$_2$ d=1.25 s.g.) with brines added with different concentrations of GLUCOPON® 215 CSUP, is evaluated.

The emulsion with the brine phase (CaCl$_2$ d=1.25 s.g.) and the synthetic filtrate corresponding to mud nr. 1 in the Table, is prepared by means of a Silverson stirrer. The operative conditions of the emulsification are 5 minutes of stirring at 5,000 rpm. The ratio between the two phases is 25:75.

A series of samples are prepared, wherein equal volumes of brines (as such or added with increasing concentrations of GLUCOPON® 215 CSUP) are put in contact with the emulsion.

The study was carried out by adjusting a static separation kinetic test of the phases with Turbiscan. This instrument is capable of monitoring over time the transmission profile and back scattering of the sample, starting from the base of the cell up to its top, revealing the presence of different phases and evolutions of the same. With this system it is possible to set aside the subjectivity of visual observations and compare the behaviour of samples prepared in different ways. 10 ml of resolver (=brine+surfactant) to be tested and 10 ml of emulsions are placed above (as the emulsion is water in oil, it necessarily remains above). An initial measurement of the sample, and other subsequent measurements over time, allow the possible phase de-mixing to be followed, until a complete disappearance of the starting emulsion.

Figure 2:
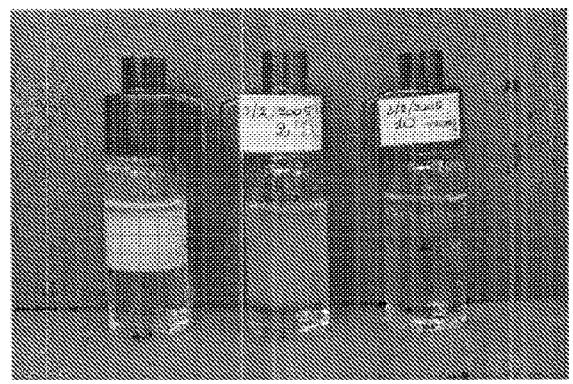
FIG. 2: Photographs after 4 hours from resolver/emulsion contact (from left to right): a blank sample having no surfactants in the resolver; a sample with 5% of DFE; and a sample with 5% of GLUCOPON® 215 CSUP.

On the basis of this test, increasing concentrations up to 5% of the surfactants DFE 726 and GLUCOPON® 215 CSUP in $CaCl_2$ d=1.25 as resolvers for an emulsion (75w/25o) prepared with $CaCl_2$ d=1.25, were initially evaluated and compared. GLUCOPON® 215 CSUP was proved to be more effective in the resolution of the emulsion, even if, at the beginning, the phase separation is more rapid with DFE. The latter, in fact, also at the highest concentration tested (5%) never leads to a total resolution of the emulsion. Three samples in comparison are photographed in FIG. 2, after 21 hours from resolver/emulsion contact: the blank sample (absence of surfactants in the resolver) and samples with 5% of DFE and GLUCOPON® 215 CSUP, respectively. It can be seen that with GLUCOPON® 215 CSUP a perfect resolution of the emulsion is obtained in two perfectly limpid phases (already in only 4 hours) whereas with DFE a turbid halo remains inside the water phase, which remains as such over time (even months). In the blank sample, the volume of the emulsion phase remains unchanged but a separation of excess of oil is observed.

Example 9

Verification of the resolution of emulsions made with synthetic filtrate and different brines added with different concentrations of GLUCOPON® 215 CSUP.

Resolution times of emulsions formed according to the protocol defined in the previous example with different brines such as KCl 3%, $CaCl_2$ 3% and $CaBr_2$ d=1.8, were determined. Solutions from 0.5 to 5% of GLUCOPON® 215 CSUP in brine were prepared as resolvers; the same type of brine was used for the preparation of the emulsion and the resolver.

The data obtained are synthetically reported in Table 4. In the presence of brine at a high saline concentration, faster resolutions of the emulsion are obtained. All the concentrations of GLUCOPON® 215 CSUP tested lead, in different times, to a complete resolution of the emulsion, whereas, in the absence of the surfactant, the emulsion remains stable.

Example 10

In this example, the resolution of emulsions made with synthetic filtrate and brine KCl 3% with different brines added with different concentrations of GLUCOPON® 215 CSUP, is evaluated.

In order to increase the resolution rate of the emulsion, it was verified whether brines different from KCl 3% were capable of carrying GLUCOPON® 215 CSUP with a higher efficiency.

In Table 5 the resolution times of the emulsion from KCl 3% with resolvers consisting of 5 and 8% of GLUCOPON® 215 CSUP in different brines, were reported.

The use of $CaCl_2$ 3% can be an advantageous alternative to KCl 3%, whereas brines having high densities do not appear to have the same efficiency.

Example 11

Temperature effect on the resolution of emulsions (made with synthetic filtrate and KCl 3%) with brine $CaCl_2$ added with GLUCOPON® 215 CSUP.

The temperature effect on the resolution times of the emulsion made with synthetic filtrate and KCl, by contact with solutions at 8% of GLUCOPON® 215 CSUP in KCl and $CaCl_2$ at 3%, was evaluated.

These tests were carried out in continuous on Turbiscan thermo-regulated at 40° C., with automatic measurements every 20 minutes, in order to allow a better discrimination of the kinetics and resolution characteristics of the emulsion.

The temperature effect allowed the resolution times to be accelerated by 60% with respect to those obtained at room temperature (1-2 days).

In Table 6 the resolutions of the emulsion obtained with brines $CaCl_2$ and KCl 3%, at room temperature and at 40° C., were reported.

The use of $CaCl_2$ at 10% instead of 3% can be considered advantageous as, even if it does not lead to significant variations in the resolution times, it allows more limpid solutions of GLUCOPON® 215 CSUP to be obtained, above all in cases in which it is used at high concentrations (8%).

Verification of the Formation of Emulsions and Prevention of their Formation in a Porous Medium Example 12

Test for evaluating the damage of the porous medium induced by the interaction of the oil filtrate with the completion brine.

The evaluation of the degree of damage caused by a fluid on a productive formation during the drilling and completion phases is performed by means of an experimental apparatus which allows the flushing of fluids in a porous medium (rock cores). The system consists of a water pressurized Hassler cell in which a rock core is inserted having a diameter of 2.54 cm and a varying length (in our tests it was 7 cm) contained in a rubber sleeve. The apparatus allows an accurate characterization of the initial and final permeability of the core and the evaluation of the residual damage of the core.

The test was performed according to the following procedure:
1. vacuum saturation of the core with the fluid SF=synthetic filtrate, which simulates the filtrate of a drilling oil-based mud. The SF contains lamium (refinery cut based on aliphatic hydrocarbons) and 1/10 of the concentration of surfactants (primary emulsifier and secondary emulsifier) used for the formulation of oil-based muds.
2. after determining the initial permeability to oil the brine $CaCl_2$ 34% is injected into the core, maintaining the pressure constant (70 bar) with the use of a cylinder equipped with a floating piston. At the same time, the quantity of fluids which have filtered through the core is monitored by means of an electronic balance connected to a data processing system.
3. Finally, if the core is not completely plugged, SF is injected again and the final permeability to oil is measured.
4. the global damage of the core is determined as the ratio between the final and the initial permeability.

Example 13

Comparative

After determining the initial permeability to oil (8 mD), following what is described at point 2 of example 12, the injection of $CaCl_2$ was started, with a pressure of 75 bar. The emission of 5 ml of oil was observed, and the filtration was subsequently blocked. The pressure was increased to 90 bar but, after the emission of a further 5-6 ml, the complete block was obtained. The attempt to inject SF with a pressure of 85-90 bar in the opposite direction with respect to that of the brine, did not allow the flow to be re-established in the core, which resulted completely damaged.

Example 14

A test with $CaCl_2$ added with 1% of the surfactant GP 215 was performed following the procedure described at point 2 of example 12. Any block of the core was observed, and its permeability was fully recovered after flushing with oil. The residual damage was consequently null.

Field Applications

Some of the most representative case histories for field applications performed with GLUCOPON® 215 CSUP added to the completion brine to prevent the formation of emulsions, are provided hereunder.

Example 15

In Amida 4 bis the well was drilled in OBM and shot in brine+GLUCOPON® 215 CSUP; in Basil 8 GLUCOPON® 215 CSUP was added to the completion brine to effect an HRWP for sand control; in Amida 4 GLUCOPON® 215 CSUP was added to the brine to control the well during wireline operations.

In all cases, the benefit of the system on the well production was noticed, which was obtained according to the estimations where a new level was completed, or was maintained according to the trend in the well in which was performed an operation where the closing of the well is required.

Italy
Amida 4BIS
Well Amida 4 BIS
Date 31 Aug. 2005
(in production for 2 months)
Qgas 96.800 $Sm^3/g$
FTHP 234 $kg/cm^2$
SBHP 483 $kg/cm^2$
Drilling fluid OBM
Completion fluid Brine+395 GLUCOPON® 215 CSUP
Basil 8
Well Basil 8
Date 10 Dec. 2005
Qgas 225.600 $Sm^3/g$ (*)
FTHP 144 $kg/cm^2$
SBHP 235 $kg/cm^2$
Drilling fluid OBM
Completion fluid Brine+3% GLUCOPON® 215 CSUP for HRPW
(*) from an early production
*Amida 4 GLUCOPON® 215 CSUP was added to the brine used for controlling the well during wireline operations. During these operations, in fact, brine could have come into contact with the formation, shot in OBM, therefore creating emulsions. The operations were successfully effected as the production of the well was restarted, with no decrease in production.

TABLE 1

| ID test | O:W mixing ratio | Electric conductivity (µs/cm) | Viscosity @ 1000 s − 1 (cP) | Viscosity @ 1 1 s − 1 (cP) |
|---|---|---|---|---|
| 1 | 75:25 | 0.09 | 100 | 2,000 |
| 2 | 50:50 | 0.07 | — | — |
| 3 | 25:75 | 0.07 | — | — |
| 4 | Brine 100% | 180 mS/cm | 1.5 | 1.5 |

TABLE 2

Electric conductivity values of brines and emulsions prepared therewith

| Type of brine | Electric conductivity of brine (mS/cm) | Emulsion conductivity (µs/cm) |
|---|---|---|
| $CaCl_2$ 3% | 43 | 30 |
| $CaCl_2$ 10% | 106.6 | 36 |
| $CaCl_2$ 38% | >200 | 41 |
| KCl 3% | 53 | 10 |
| $CaBr_2$ 54% | >200 | 45 |

TABLE 3

Electric conductivity values of surfactant/water/SF systems

| Surfactant | Concentration (%) | Electric conductivity (mS/cm) |
|---|---|---|
| SIMULSOL SL 4 APG | 1 | 0.135 (W/O emulsion) |
| SIMULSOL SL 8 APG | 1 | 166 |
| SIMULSOL SL 10 APG | 1 | 166 |
|  | 0.4 | 94 |
| GLUCOPON ® 215 CSUP | 1 | 166 |
|  | 0.4 | 166 |
|  | 0.2 | 152 |
| Brine ($CaCl_2$ 34%) as such for comparison |  | 180 |

TABLE 4

Emulsion resolution times for various resolvers tested

| Type of brine | GLUCOPON ® 215 CSUP concentration | | | | | |
|---|---|---|---|---|---|---|
|  | 5% | 3% | 2% | 1% | 0.5% | 0% |
| $CaBr_2$ d = 1.8 | 1 h 45' ± 10' | 1 h 45' ± 10' | 1 h 45' ± 10' | 1 h 45' ± 10' | 3-6 h | Stable emulsion |
| $CaCl_2$ d = 1.25 | 3 h 50' ± 10' |  | 4-21 h |  | 21 h |  |
| $CaCl_2$ 3% | 3 days |  | 3-8 days |  |  |  |
| KCl 3% | 6 days |  | 6-22 days |  |  |  |

TABLE 5

Resolution times of the emulsion from KCl 3% with
different brines and two GLUCOPON ® 215 CSUP concentrations

| Brine | Resolution time with GLUCOPON ® 215 CSUP 5% | Resolution time with GLUCOPON ® 215 CSUP 8% |
|---|---|---|
| KCl 3% | 6 days | 2-3 days |
| CaCl$_2$ 3% | 2 days | 1-2 days |
| CaCl$_2$ d = 1.25 | 2-5 days (with initial expansion of the emulsion) | |
| CaBr$_2$ d = 1.8 | 2-5 days (with initial expansion of the emulsion) | |

TABLE 6

Resolution times of the emulsion from KCl 3% obtained
at temperatures of 25 and 40° C. with GLUCOPON ® 215 CSUP 8%
carried by two different brines (KCl and CaCl$_2$ 3%)

| | Resolution time with GLUCOPON ® 215 CSUP 8% | |
|---|---|---|
| Brine | T = 25° C. | T = 40° C. |
| KCl 3% | 2-3 days | >26 hrs |
| CaCl$_2$ 3% | 1-2 days | 14 hr |

The invention claimed is:

1. A process, comprising:
preventing the formation of a W/O inverse emulsion by injecting a water-based fluid into an oil well comprising an oil-based mud, thereby contacting the water-based fluid with the oil-based mud, which is present in the well as a residue or a filtrate from a porous matrix,
wherein the water-based fluid, comprises water and:
a non-ionic surfactant, which is stable in a temperature range from 10 to 90° C., has an HLB in a range from 8 to 20, and is soluble in water; and
a salt,
wherein the non-ionic surfactant comprises a $C_8$ alkyl polyglucoside, a $C_{10}$ alkyl polyglucoside, or a mixture thereof, and
wherein the salt is present, and is present in an amount up to 60% by weight, based on a total weight of the fluid.

2. The process of claim 1, wherein the water-based fluid comprises 0.1 to 1% by weight of the non-ionic surfactant, based on a total weight of the water-based fluid.

3. The process of claim 1, wherein the oil-based mud comprises:
(A) a paraffin oil, which acts as a dispersing phase; and
(B1) a surfactant or (B2) a pair of surfactants, wherein the first surfactant of the pair acts as a primary emulsifier and the second surfactant of the pair acts as a secondary emulsifier.

4. The process of claim 3, wherein the paraffin oil is lamium.

5. The process of claim 3, wherein the oil-based mud comprises the pair of surfactants (B2), and a concentration of the primary emulsifier present in the oil-based mud is from 3-5% v/v and a concentration of the secondary emulsifier present in the oil-based mud is from 1-3% v/v.

6. The process of claim 1, wherein the water-based fluid comprises as the salt, based on a total weight of the fluid, from 1-35% by weight of CaCl$_2$.

7. The process of claim 1, wherein the water-based fluid comprises as the salt, based on a total weight of the fluid, from 1-10% by weight of KCl.

8. The process of claim 1, wherein the water-based fluid comprises as the salt, based on a total weight of the fluid, from 40-60% by weight of CaBr$_2$.

9. The process of claim 1, wherein the water-based fluid comprises only one non-ionic surfactant, which is a $C_8$ alkyl polyglucoside.

10. The process of claim 1, wherein the water-based fluid comprises only one non-ionic surfactant, which is a $C_{10}$ alkyl polyglucoside.

11. A process, comprising:
resolving a W/O inverse emulsion by injecting a water-based fluid into an oil well, which was drilled with an oil-based mud and comprises a W/O inverse emulsion, thereby contacting the water-based fluid with the W/O inverse emulsion,
wherein the water-based fluid, comprises water and:
a non-ionic surfactant, which is stable in a temperature range from 10 to 90° C., has an HLB in a range from 8 to 20, and is soluble in water; and
a salt,
wherein the non-ionic surfactant comprises a $C_8$ alkyl polyglucoside, a $C_{10}$ alkyl polyglucoside, or a mixture thereof, and
wherein the salt is present, and is present in an amount up to 60% by weight, based on a total weight of the fluid.

12. The process of claim 11, wherein the water-based fluid comprises 0.2 to 5% by weight of the non-ionic surfactant, based on a total weight of the water-based fluid.

13. The process of claim 11, wherein the oil-based mud comprises:
(A) a paraffin oil, which acts as a dispersing phase; and
(B1) a surfactant or (B2) a pair of surfactants, wherein the first surfactant of the pair acts as a primary emulsifier and the second surfactant of the pair acts as a secondary emulsifier.

14. The process of claim 13, wherein the paraffin oil is lamium.

15. The process of claim 13, wherein the oil-based mud comprises the pair of surfactants (B2), and a concentration of the primary emulsifier present in the oil-based mud is from 3-5% v/v and a concentration of the secondary emulsifier present in the oil-based mud is from 1-3% v/v.

16. The process of claim 11, wherein the water-based fluid comprises as the salt, based on a total weight of the fluid, from 1-35% by weight of CaCl$_2$.

17. The process of claim 11, wherein the water-based fluid comprises as the salt, based on a total weight of the fluid, from 1-10% by weight of KCl.

18. The process of claim 11, wherein the water-based fluid comprises as the salt, based on a total weight of the fluid, from 40-60% by weight of CaBr$_2$.

19. The process of claim 11, wherein the water-based fluid comprises only one non-ionic surfactant, which is a $C_8$ alkyl polyglucoside.

20. The process of claim 11, wherein the water-based fluid comprises only one non-ionic surfactant, which is a $C_{10}$ alkyl polyglucoside.

* * * * *